(12) United States Patent
Azima et al.

(10) Patent No.: US 6,519,349 B1
(45) Date of Patent: *Feb. 11, 2003

(54) LOUDSPEAKER

(75) Inventors: Henry Azima, Cambridge (GB); Martin Colloms, London (GB); Neil John Harris, Cambridge (GB)

(73) Assignee: New Transducers Limited, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 09/570,051

(22) Filed: May 12, 2000

Related U.S. Application Data

(63) Continuation-in-part of application No. 09/011,831, filed on May 13, 1998, which is a continuation-in-part of application No. 08/707,042, filed as application No. PCT/GB96/02148 on Sep. 2, 1996.

(30) Foreign Application Priority Data

| Sep. 2, 1995 | (GB) | ............................................. 9517918 |
| Oct. 31, 1995 | (GB) | ............................................. 9522281 |
| Mar. 30, 1996 | (GB) | ............................................. 9606836 |

(51) Int. Cl.$^7$ ............................................. H04R 25/00
(52) U.S. Cl. ........................ 381/396; 381/152; 381/412
(58) Field of Search ................................. 381/338, 152, 381/396, 412, 417, 425, 431, FOR 152, FOR 163, 151; 181/199, 142, 143

(56) References Cited

U.S. PATENT DOCUMENTS

| 1,778,084 | A | 10/1930 | Nevin | |
| 3,111,187 | A | 11/1963 | Barlow | ......................... 181/32 |
| 3,430,007 | A | 2/1969 | Thielen | ..................... 179/115.5 |
| 3,553,392 | A | 1/1971 | Liebscher | ................. 179/115.5 |
| 3,651,283 | A | 3/1972 | Doschek | .............. 179/115.5 R |
| 3,728,497 | A | 4/1973 | Komatsu | ................ 179/181 W |
| 4,055,732 | A | 10/1977 | Yoshimura et al. | .......... 179/117 |
| 4,392,027 | A | 7/1983 | Bock | ...................... 179/181 W |
| 4,506,117 | A | 3/1985 | Fresard | ..................... 179/114 R |
| 4,720,868 | A | 1/1988 | Hirano | ......................... 381/182 |
| 5,894,263 | A | 4/1999 | Shimakawa et al. | ...... 340/388.1 |
| 6,151,402 | A | * | 11/2000 | Azima et al. | ................ 381/396 |
| 6,192,136 | B1 | * | 2/2001 | Azima et al. | ................ 381/338 |

FOREIGN PATENT DOCUMENTS

| GB | 2 023 375 | 12/1979 |
| WO | WO 89/00798 | 1/1989 |
| WO | WO 92/03024 | 2/1992 |

OTHER PUBLICATIONS

Abstract of JP 60–259100, vol. 010, No. 129, (E–403), May 14, 1986, Yoshirou Nakamatsu, "Vibrating Device Supported by Plural Parting and Independent Fluids".

* cited by examiner

*Primary Examiner*—Huyen Le
(74) *Attorney, Agent, or Firm*—Foley & Lardner

(57) ABSTRACT

A panel-form loudspeaker having a member capable of sustaining and propagating input vibrational energy by bending waves, and a transducer mounted on the member for applying a local couple to the member. The motor coil assembly of the transducer has a surrounding attachment portion rigidly attached to one face of the member in spaced relation to the central attachment portion of the magnet assembly of the transducer. When the transducer is energized, the motor coil assembly and the magnet assembly move in opposite directions to apply a couple to the member through their respective spaced attachment portions to launch bending waves into the member.

10 Claims, 4 Drawing Sheets

LOUDSPEAKER

This application is a continuation-in-part of application Ser. No. 09/011,831, filed May 13, 1998, as international application No. PCT/GB96/02148 filed Sep. 2, 1996, which is a continuation-in-part of application Ser. No. 08/707,012, filed Sep. 3, 1996.

TECHNICAL FIELD

The invention relates to loudspeakers and, more particularly, to loudspeakers comprising panel-form acoustic radiating elements.

BACKGROUND ART

U.S. Pat. No. 6,058,196 to Heron discloses a panel-form loudspeaker comprising a resonant multi-mode radiator element being a unitary sandwich panel formed of two skins of material with a spacing core of transverse cellular construction, wherein the panel is such as to have ratio of bending stiffness (B), in all orientations, to the cube power of panel mass per unit surface area ($\mu$) of at least 10; a mounting means which supports the panel or attaches to it a supporting body, in a free undamped manner; and an electromechanical drive means coupled to the panel which serves to excite a multi-modal resonance in the radiator panel in response to an electrical input within a working frequency band for the loudspeaker.

U.S. Pat. No. 4,506,117 to Fresard discloses an electroacoustic transducer comprising an inertial mass adapted to be attached rigidly by its base plate to a panel to be vibrated.

U.S. Pat. No. 4,392,027 to Bock discloses an interior aircraft panel which functions as a loudspeaker diaphragm when excited by an electromagnetic driver coupled to the panel.

SUMMARY OF THE INVENTION

In parent application Ser. No. 09/011,831, a transducer of the type described herein is disclosed as part of a loudspeaker when coupled to a panel member of the type disclosed in parent application Ser. No. 08/707,012. Such a panel member functions as a distributed mode acoustic radiator, and has capability to sustain and propagate input vibrational energy by bending waves in an operative area extending transversely of thickness often but not necessarily to edges of the member; is configured with or without anisotropy of bending stiffness to have resonant mode vibration components distributed over the area beneficially for acoustic coupling with ambient air; and has predetermined preferential locations or sites within the area for transducer means, particularly operationally active or moving region(s) thereof effective in relation to acoustic vibrational activity in the area and signals, usually electrical, corresponding to acoustic content of such vibrational activity.

This invention is concerned with loudspeakers which use the same type of transducer, coupled to any member which is capable of sustaining and propagating input vibrational energy by bending waves, regardless of the nature of the distribution of that energy across the member.

Accordingly, the invention is a loudspeaker comprising a member having opposed faces and a capability to sustain and propagate input vibrational energy by bending waves in at least one operative area extending transversely of thickness, and a transducer mounted on the member for vibrating the member forming an acoustic radiator which provides an acoustic output. The transducer comprises a motor coil assembly having a coil rigidly fixed to a tubular member, and a magnet assembly, having opposed pole pieces, the periphery of one of the pole pieces being disposed within and adjacent to the motor coil assembly, and the periphery of the other pole piece being disposed outside of and adjacent to the motor coil assembly. The magnet assembly has a central attachment portion rigidly attached to the member to be vibrated. The motor coil assembly surrounds and is spaced from the central attachment portion of the magnet assembly, and has a surrounding attachment portion rigidly attached to one face of the member in spaced relation to the central attachment portion of the magnet assembly. The motor coil assembly and the magnet assembly move in opposite directions when a signal current is applied to the motor coil assembly, whereby the motor coil assembly and the magnet assembly apply a couple to the member through their respective spaced attachment portions to launch bending waves into the member.

In an alternative form the transducer for the loudspeaker may have complementary motor coil assemblies and magnet assemblies mounted on opposite faces of the member, with a fastener tying the centres of the magnet assemblies together or push/pull operation.

BRIEF DESCRIPTION OF THE DRAWING

Examples which embody the best mode for carrying out the invention are described in detail below and are diagrammatically illustrated in the accompanying drawing, in which.

DETAILED DESCRIPTION

Figure 1:
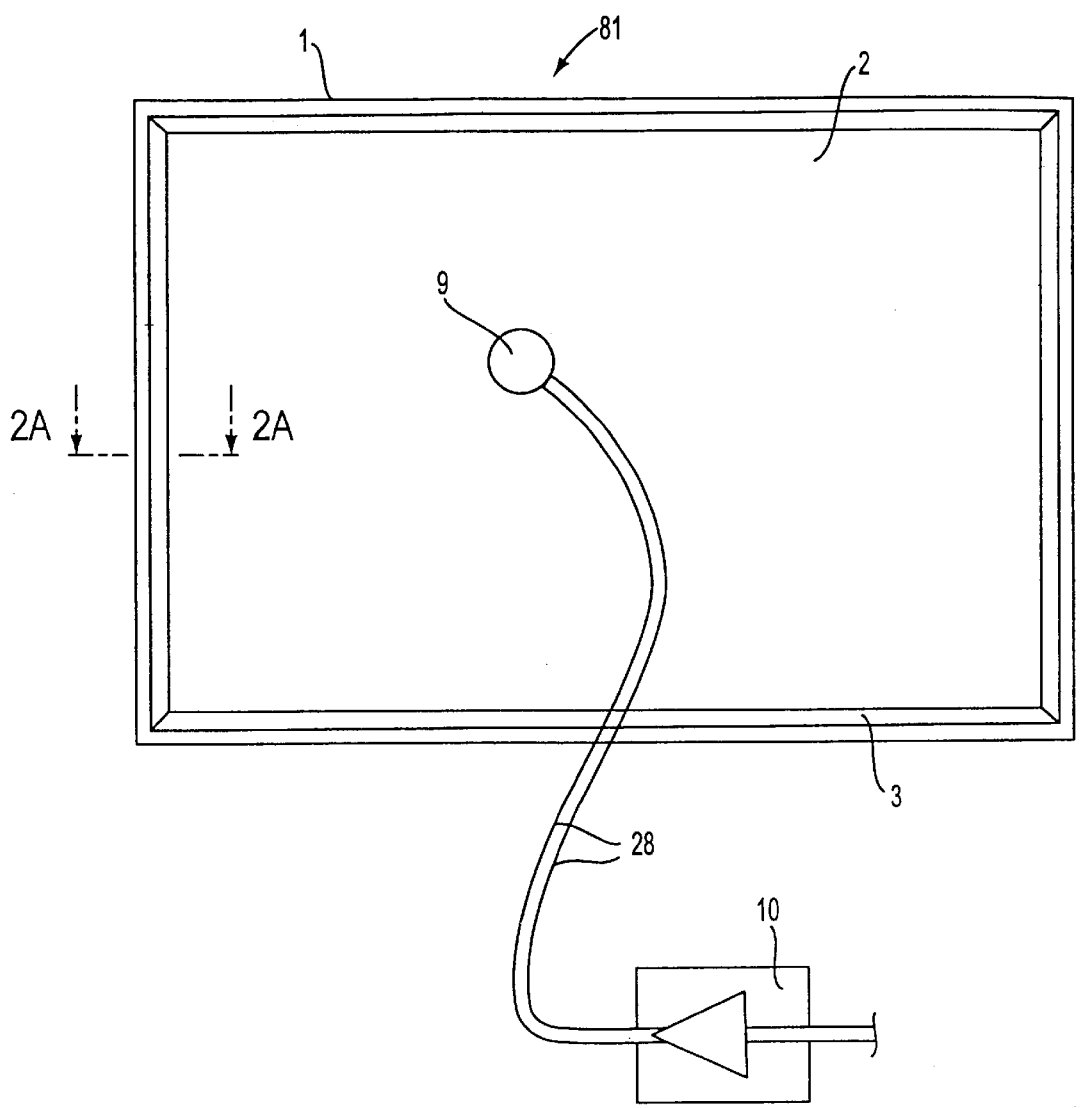
FIG. 1 is a diagram showing a panel-form loudspeaker according to the invention.

Referring to FIG. 1 of the drawing, there is shown a panel-form loudspeaker (81) comprising a rectangular frame (1) carrying a resilient suspension (3) round its inner periphery which supports a sound radiating panel (2). A transducer (9) is mounted wholly and exclusively on or in the panel (2). Transducer (9) may be located anywhere on the panel, but preferably is located in a region of relatively high vibrational activity, e.g. as described in parent application Ser. No. 08/707,012, to launch bending waves into the panel to cause the panel to radiate an acoustic output. The transducer (9) is driven by a signal amplifier (10), e.g. an audio amplifier, connected to the transducer by conductors (28). Amplifier loading and power requirements can be entirely normal, similar to conventional cone type speakers, sensitivity being of the order of 86–88 dB/watt under room loaded conditions. Amplifier load impedance is largely resistive at 6 ohms, power handling 20–80 watts. Where the panel core and/or skins are of metal, they may be made to act as a heat sink for the transducer to remove heat from the motor coil of the transducer and thus improve power handling.

Figure 2A:
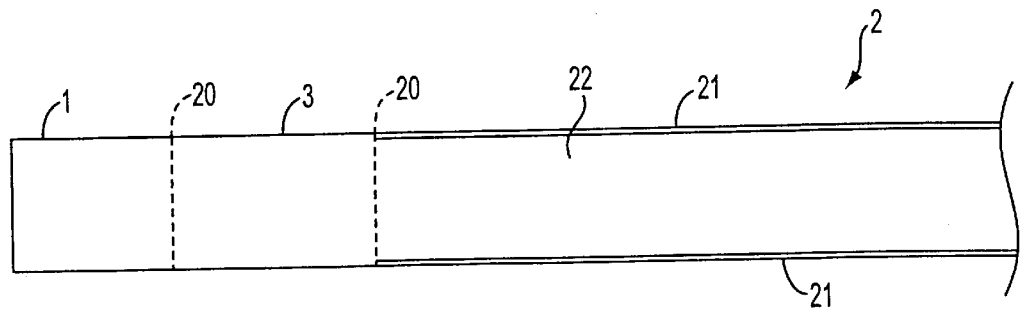
FIG. 2a is a partial sectional view taken on the line 2A—2A of FIG. 1.
Figure 2B:
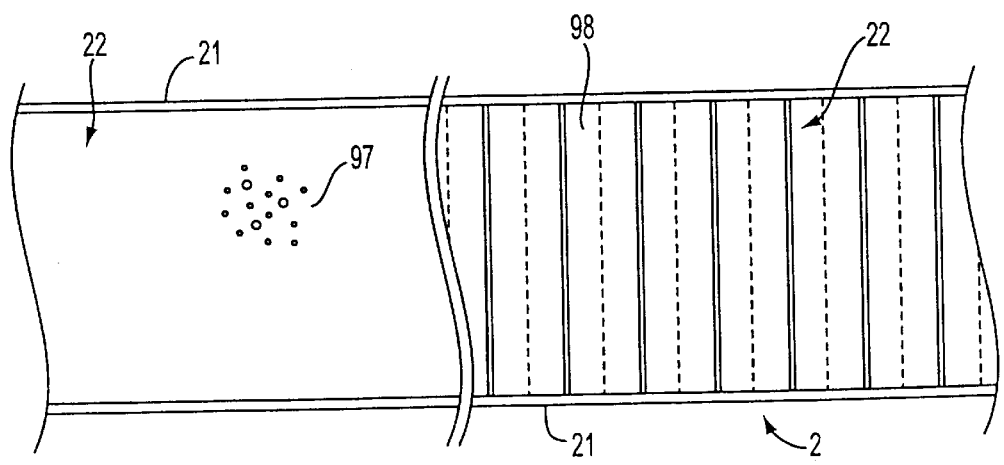
FIG. 2b is an enlarged cross-section through an acoustic radiator of the kind shown in FIG. 2a and showing two alternative constructions.

FIGS. 2a and 2b are partial typical cross-sections through the loudspeaker (81) of FIG. 1. FIG. 2a shows that the frame (1), surround (3) and panel (2) are connected together by respective adhesive-bonded joints (20). Suitable materials for the frame include lightweight framing, e.g. picture framing of extruded metal e.g. aluminium alloy or plastics. Suitable surround materials include resilient materials such as foam rubber and foam plastics. Suitable adhesives for the joints (20) include epoxy, acrylic and cyano-acrylate etc. adhesives.

The panel (2) may be made of any suitable material having properties such that it will sustain and propagate input vibrational energy by bending waves to produce an acoustic output. FIG. 2b illustrates, to an enlarged scale, that the panel (2) may be a rigid lightweight panel having a core (22) e.g. of a rigid plastics foam (97), e.g. cross linked polyvinylchloride or a cellular matrix (98), i.e. a honeycomb matrix of metal foil, plastics or the like, with the cells extending transversely to the plane of the panel, and enclosed by opposed skins (21) e.g. of paper, card, plastics or metal foil or sheet. Where the skins are of plastics, they may be reinforced with fibres e.g. of carbon, glass, Kevlar® or the like in a manner known per se to increase their modulus.

Envisaged skin layer materials and reinforcements thus include carbon, glass, Kevlar®, Nomex® i.e. aramid etc. fibres in various lays and weaves, as well as paper, bonded paper laminates, melamine, and various synthetic plastics films of high modulus, such as Mylar®, Kaptan®, polycarbonate, phenolic, polyester or related plastics, and fibre reinforced plastics, etc. and metal sheet or foil. Investigation of the Vectra grade of liquid crystal polymer thermoplastics shows that they may be useful for the injection moulding of ultra thin skins or shells of smaller size, say up to around 30 cm diameter. This material self forms an orientated crystal structure in the direction of injection, a preferred orientation for the good propagation of treble energy from the driving point to the panel perimeter.

Additional such moulding for this and other thermoplastics allows for the mould tooling to carry location and registration features such as grooves or rings for the accurate location of transducer parts, e.g. the motor coil, and the magnet suspension. Additionally with some weaker core materials it is calculated that it would be advantageous to increase the skin thickness locally e.g. in an area or annulus up to 150% of the transducer diameter, to reinforce that area and beneficially couple vibration energy into the panel. High frequency response will be improved with the softer foam materials by this means.

Envisaged core layer materials include fabricated honeycombs or corrugations of aluminium alloy sheet or foil, or Kevlar®, Nomex®, plain or bonded papers, and various synthetic plastics films, as well as expanded or foamed plastics or pulp materials, even aerogel metals if of suitably low density. Some suitable core layer materials effectively exhibit usable self-skinning in their manufacture and/or otherwise have enough inherent stiffness for use without lamination between skin layers. A high performance cellular core material is known under the trade name Rohacell® which may be suitable as a radiator panel and which is without skins. In practical terms, the aim is for an overall lightness and stiffness suited to a particular purpose, specifically including optimising contributions from core and skin layers and transitions between them.

Several of the preferred formulations for the panel employ metal and metal alloy skins, or alternatively a carbon fibre reinforcement. Both of these, and also designs with an alloy Aerogel or metal honeycomb core, will have substantial radio frequency screening properties which should be important in several EMC applications. Conventional panel or cone type speakers have no inherent EMC screening capability.

In addition the preferred form of piezo and electro dynamic transducers have negligible electromagnetic radiation or stray magnetic fields. Conventional speakers have a large magnetic field, up to 1 meter distant unless specific compensation counter measures are taken.

Where it is important to maintain the screening in an application, electrical connection can be made to the conductive parts of an appropriate panel or an electrically conductive foam or similar interface may be used for the edge mounting.

The suspension (3) may damp the edges of the panel (2) to prevent excessive edge movement of the panel. Additionally or alternatively, further damping may be applied, e.g. as patches, bonded to the panel in selected positions, e.g. to damp excessive movement or otherwise modify the behavior of the panel. The patches may be of bitumen-based material, as commonly used in conventional loudspeaker enclosures or may be of a resilient or rigid polymeric sheet material. Some materials, notably paper and card, and some cores may be self-damping. Where desired, the damping may be increased in the construction of the panels by employing resiliently setting, rather than rigid setting adhesives.

Effective said selective damping includes specific application to the panel including its sheet material of means permanently associated therewith. Edges and corners can be particularly significant for dominant and less dispersed low frequency vibration modes. Edge-wise fixing of damping means can usefully lead to a panel with its said sheet material fully framed, though their corners can often be relatively free, say for desired extension to lower frequency operation. Attachment can be by adhesive or self-adhesive materials. Other forms of useful damping, particularly in terms of more subtle effects and/or mid- and higher frequencies can be by way of suitable mass or masses affixed to the sheet material at predetermined effective medial localised positions of said area.

While the radiation from the acoustic panel is largely non-directional, the percentage of phase related information increases off axis. For improved focus for the phantom stereo image, placement of the speakers, like pictures, at the usual standing person height, confers the benefit of a moderate off-axis placement for the normally seated listener optimising the stereo effect. Likewise the triangular left/right geometry with respect to the listener provides a further angular component. Good stereo is thus obtainable.

There is a further advantage for a group of listeners compared with conventional speaker reproduction. The intrinsically dispersed nature of acoustic panel sound radiation gives it a sound volume which does not obey the inverse square law for distance for an equivalent point source. Because the intensity fall-off with distance is much less than predicted by inverse square law then consequently for off-centre and poorly placed listeners the intensity field for the panel speaker promotes a superior stereo effect compared to conventional speakers. This is because the off-centre placed listener does not suffer the doubled problem due to proximity to the nearer speaker; firstly the excessive increase in loudness from the nearer speaker, and then the corresponding decrease in loudness from the further loudspeaker.

Figure 3:
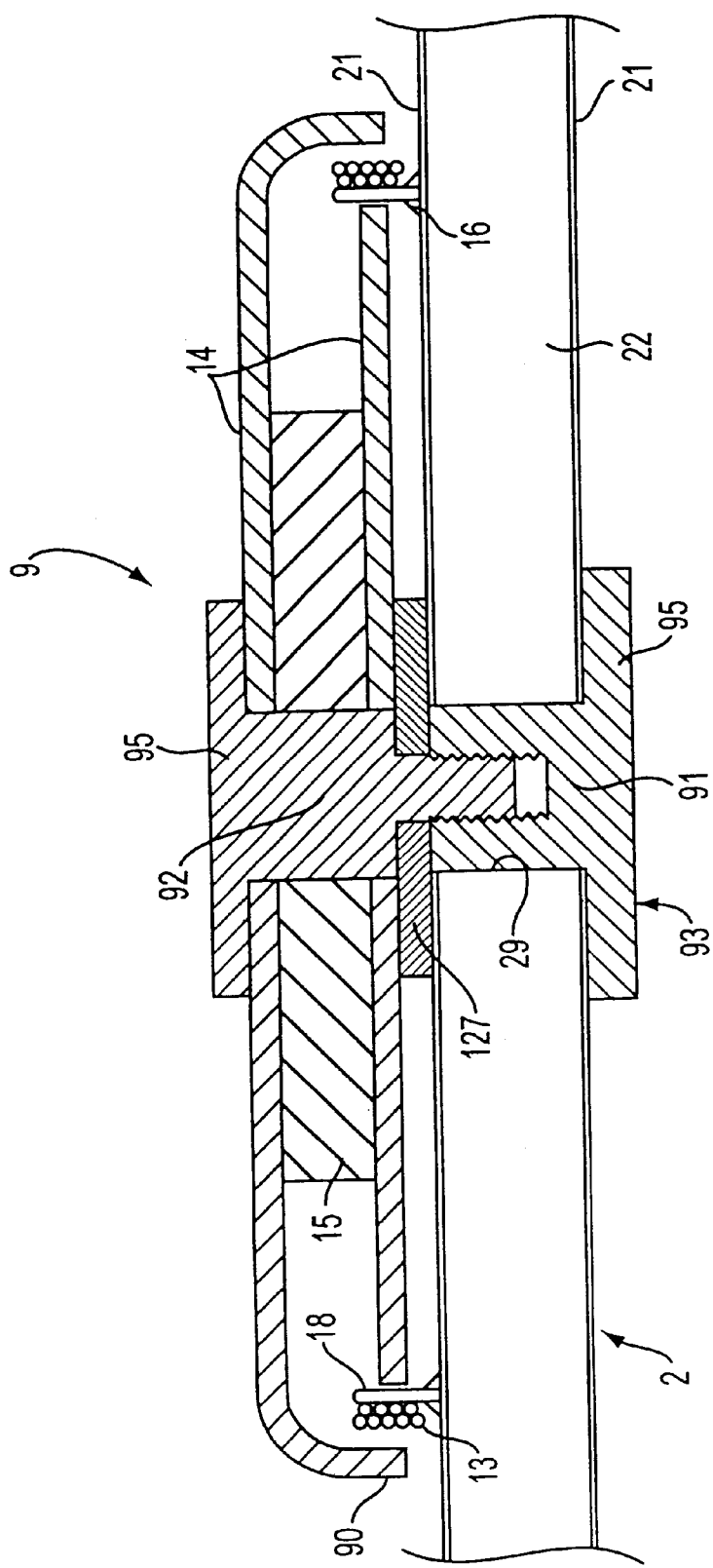
FIG. 3 is a cross-sectional view of a first embodiment of transducer according to the present invention.

FIG. 3 illustrates an embodiment of transducer (9) for launching bending waves into a rigid lightweight acoustic radiator panel (2), e.g. of the kind shown in FIGS. 1 and 2 comprising a core (22) enclosed by opposed skins (21), to cause the panel to vibrate.

The transducer comprises a coil (13) rigidly fixed, e.g. by means of an adhesive, on the outside of a coil former (18) which is rigidly bonded to a surface skin (21) of the radiator panel (2), e.g. by means of an epoxy adhesive bond (16). A magnet (15) is enclosed by a pair of poles (14), one of which is disc-like and is disposed with its periphery close to the interior of the coil former (18), and the other of which has a peripheral flange (90) arranged to surround the coil (13).

The magnet assembly including the magnet (15) and poles (14) is mounted on the panel (2) by means of a fastener (93), e.g. of metal or hard plastics, which passes through a cavity (29) extending through the panel (2). The fastener (93) comprises a complementary pair of threaded members (91, 92) each having heads (95), one of which heads bears against an outer face of the transducer (9) and the other of which heads bear against a face of the panel (2) on the side of the panel opposite to that on which the transducer is mounted. A spacer (127) is trapped between the transducer (9) and the panel (2) to space the transducer from the panel.

The transducer (9) of FIG. 3 operates by locally resiliently bending the panel between the fastener (93) and the former (18) when an acoustic signal is applied to the transducer to launch bending waves into the panel.

Figure 4:
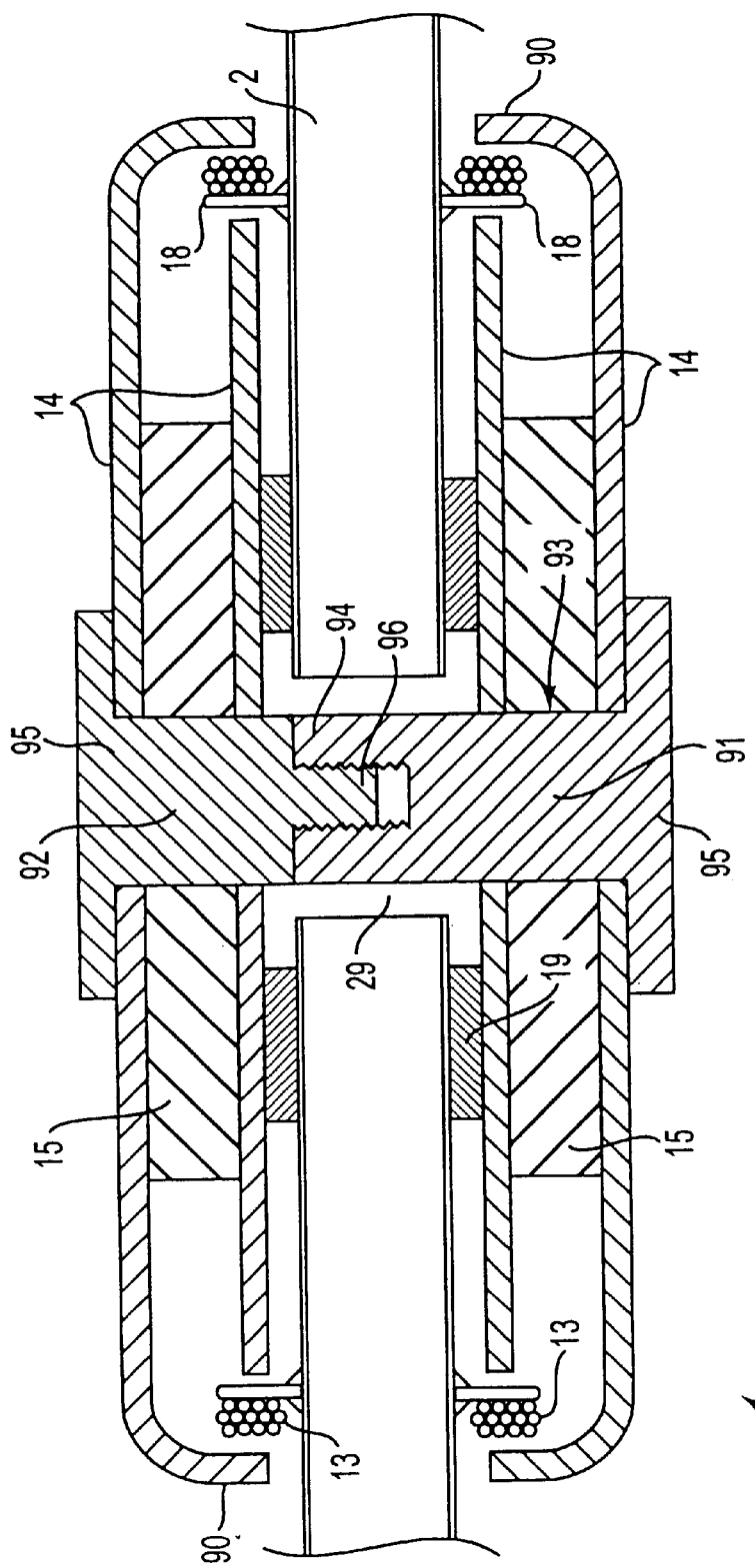
FIG. 4 is a cross-sectional view of a second embodiment of transducer according to the present invention.

The transducer arrangement (9) of FIG. 4 is similar to that described in FIG. 3, except that in this embodiment the transducer comprises complementary push/pull drivers of the kind shown in FIG. 3 disposed on opposite sides of the panel. A fastener (93) is arranged to pass through an aperture (29) in the panel (2) to tie the two drivers together and to the panel. The fastener (93) comprises opposed generally complementary parts each formed with a head (95) which are clamped against the axial extremities of the respective pair of drivers (9) to couple the drivers together. The complementary parts of the fastener (93) are secured together by complementary screw-threaded portions (94, 96). The fastener may be of any suitable material, e.g. plastics or metal.

In this embodiment the transducer device (9) is rigidly clamped to the panel (2) by means of rigid spacer pads (19), e.g. of hard plastics, positioned between the panel and the poles (14) adjacent to the aperture (29), whereby the transducer works to launch bending waves into the panel by local resilient bending of the panel between the pads and the coil former (18).

What is claimed is:

1. A loudspeaker comprising:
    a member having opposed faces and a capability to sustain and propagate input vibrational energy by bending waves in at least one operative area extending transversely of thickness, and
    a transducer mounted on said member for vibrating the member forming an acoustic radiator which provides an acoustic output, the transducer comprising:
        a motor coil assembly having a coil rigidly fixed to a tubular member, and
        a magnet assembly, having opposed pole pieces, the periphery of one of said pole pieces being disposed within and adjacent to the motor coil assembly, and the periphery of the other of said pole pieces being disposed outside of and adjacent to the motor coil assembly,
        wherein the magnet assembly has a central attachment portion rigidly attached to the member to be vibrated,
        wherein the motor coil assembly surrounds and is spaced from said central attachment portion of the magnet assembly and has a surrounding attachment portion rigidly attached to one face of the member in spaced relation to said central attachment portion of the magnet assembly, and
        wherein the motor coil assembly and the magnet assembly move in opposite directions when a signal current is applied to the motor coil assembly, whereby the motor coil assembly and the magnet assembly apply a couple to the member through their respective spaced attachment portions to launch bending waves into the member.

2. A loudspeaker according to claim 1, wherein said transducer further comprises a fastener which rigidly secures the magnet assembly at its centre to the member.

3. A loudspeaker according to claim 2, wherein the fastener engages in a cavity in the member.

4. A loudspeaker according to claim 3, wherein the fastener comprises a spacer which spaces the peripheries of the pole pieces from the said member.

5. A loudspeaker according to claim 1, comprising complementary motor coil assemblies and magnet assemblies mounted on opposed faces of the said member, said fastener tying the centres of the magnet assemblies together for push/pull operation.

6. A loudspeaker according to claim 5, wherein the fastener has heads at opposite ends which engage the respective magnet assemblies, a pair of interengaging screw-threaded portions, and spacers disposed adjacent to the screw-threaded portions and sandwiched between the respective magnet assemblies and the opposed faces of the said member.

7. A loudspeaker according to claim 1, wherein said magnet assembly comprises at least one magnet interposed between said pole pieces, and the motor coil assembly surrounds said at least one magnet.

8. A loudspeaker according to claim 7, wherein said tubular member has two open ends, said surrounding attachment portion of the motor coil assembly comprises one end of said tubular member, said other of said pole pieces comprises a disclike portion extending across and spaced from the other end of said tubular member, and the periphery of said other of said pole pieces comprises a surrounding flange extending from said disclike portion and surrounding the motor coil assembly.

9. A loudspeaker according to claim 1, wherein said tubular member has two open ends, and said surrounding attachment portion of the motor coil assembly comprises one end of said tubular member.

10. A loudspeaker according to claim 9, wherein said one end of said tubular member is rigidly attached to one face of the member by adhesive.

* * * * *